US007472391B2

(12) United States Patent
Alcazar et al.

(10) Patent No.: US 7,472,391 B2
(45) Date of Patent: Dec. 30, 2008

(54) RESOURCE LOADER FOR APPLICATIONS THAT UTILIZE RELATIVE UNIFORM RESOURCE IDENTIFIERS

(75) Inventors: Mark Alcazar, Seattle, WA (US); WeiBing Zhan, Sammamish, WA (US); Sundaram Ramani, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 728 days.

(21) Appl. No.: 10/783,767

(22) Filed: Feb. 20, 2004

(65) Prior Publication Data

US 2005/0188383 A1    Aug. 25, 2005

(51) Int. Cl.
*G06F 9/46* (2006.01)

(52) U.S. Cl. ................... 718/104; 709/226; 719/331

(58) Field of Classification Search ................ 719/310, 719/318, 328, 331; 718/1, 100, 104; 709/204, 709/217, 245, 226, 229; 717/101, 111, 120, 717/140, 148, 153, 166; 712/233–237
See application file for complete search history.

(56) References Cited

U.S. PATENT DOCUMENTS

| | | | | |
|---|---|---|---|---|
| 4,768,150 A | * | 8/1988 | Chang et al. | 719/328 |
| 5,095,421 A | * | 3/1992 | Freund | 718/101 |
| 5,440,740 A | * | 8/1995 | Chen et al. | 718/104 |
| 6,006,279 A | * | 12/1999 | Hayes | 719/328 |
| 6,247,041 B1 | * | 6/2001 | Krueger et al. | 718/104 |
| 6,766,348 B1 | * | 7/2004 | Combs et al. | 718/104 |
| 6,917,963 B1 | * | 7/2005 | Hipp et al. | 709/204 |
| 6,947,925 B2 | * | 9/2005 | Newcombe et al. | 707/3 |
| 7,017,162 B2 | * | 3/2006 | Smith et al. | 719/328 |
| 7,203,941 B2 | * | 4/2007 | Demsey et al. | 718/1 |
| 2003/0023752 A1 | * | 1/2003 | Williamson et al. | 709/245 |
| 2003/0093496 A1 | * | 5/2003 | O'Connor et al. | 709/217 |
| 2003/0200532 A1 | * | 10/2003 | Gensel | 717/120 |
| 2003/0204553 A1 | | 10/2003 | Neylon | 709/104 |
| 2004/0044791 A1 | | 3/2004 | Pouzzner | 709/245 |
| 2005/0010924 A1 | * | 1/2005 | Hipp et al. | 718/104 |
| 2005/0028162 A1 | * | 2/2005 | Allen | 718/104 |

\* cited by examiner

*Primary Examiner*—Van H Nguyen
(74) *Attorney, Agent, or Firm*—Merchant & Gould PC (57) ABSTRACT

A resource loader provides resource lookup and redirection to computer software applications. The resource loader allows applications to be written using relative Uniform Resource Identifier ("URI") rather than hard-coded URI that includes a protocol identified at the beginning of the URI and further indicates the location of the resource in a fully qualified path. During execution, applications may initiate execution of the resource loader that in turn locates and returns the resource to the application. In this way, applications may be written that are agnostic as to how their resources are packaged. That is, a change of resource packaging does not necessitate a re-write of the application source code. In some cases, the resource loader may be accessed by one or more applications through an Application Program Interface (API) provided by the resource loader. The applications may also pass a resource identifier for the desired resource to the resource loader.

12 Claims, 8 Drawing Sheets

RESOURCE LOADER FOR APPLICATIONS THAT UTILIZE RELATIVE UNIFORM RESOURCE IDENTIFIERS

TECHNICAL FIELD

The present invention relates generally to the field of computer software applications and more particularly to a resource loader to provide resource lookup and redirection to applications.

BACKGROUND OF THE INVENTION

Software applications, during execution, may utilize various types of resources on the system upon which the application is executed as well as resources located elsewhere. For example, an application may read from or write to a file stored on a storage device on the system executing the application. In another case, the application may manipulate data that is resident in the system's memory. In yet another example, the application may read a web page located on a server connected with the system executing the application via a network such as the Internet.

To locate and access these resources, applications implement various well-known or custom protocols. These protocols and the locations of the resources are identified in a Uniform Resource Identifier (URI). Typically, the source code of an application accessing a given resource includes a hard-coded URI that includes a protocol identified at the beginning of a URI and further indicates the location of the resource in a fully qualified path. For example, the application may use a protocol such as "res:" to load resources embedded in the application as Win32® resources. In another example, the application may use HyperText Transfer Protocol ("http:") to load resources over a network. The protocols identified in these URIs are followed by the location of the resource. For example, a resource located on an Internet web page may be identified by the fully qualified URI "http://www.resources.com/resource1.html."

One drawback of this approach is that changes in application packaging decisions require changes to the fully qualified URIs hard-coded in the source code of the application. For example, if a software provider wishes to change the location of a resource from being resident in the memory of the system executing the application to being stored on a network, all URIs for that resource must be changed in the source code of the application. Given the size of many application programs, such a rewrite is tedious and time consuming. This approach therefore does not provide an effective, easy to use way to allow the source URIs used in an application to be independent of packaging decisions. It is with respect to these considerations and others that the present invention has been made.

SUMMARY OF THE INVENTION

In accordance with the present invention, the above and other problems are solved by a resource loader to provide resource lookup and redirection to applications. Generally speaking, the resource loader allows applications to be written using relative URI's rather than fully qualified URIs. During execution, applications may initiate execution of the resource loader that in turn locates and returns the resource to the application. In this way, applications may be written that are agnostic as to how their resources are packaged. That is, a change of resource packaging does not necessitate a re-write of the application source code. In some cases, the resource loader may be accessed by one or more applications through an Application Program Interface (API) provided by the resource loader. The applications may also pass a resource identifier for the desired resource to the resource loader.

In accordance with still other aspects, the present invention relates to a method of resource lookup. The method comprises receiving a resource identifier from an application indicating a resource to be utilized by the application. The resource is located based on the resource identifier and code generated during compilation of the application. The resource is then returned to the application.

In accordance with other aspects, the present invention relates to a system for resource lookup. The system comprises a processor and a memory coupled with and readable by the processor. The memory contains a series of instructions that, when executed by the processor, cause the processor to receive a resource identifier from an application indicating a resource to be utilized by the application. The resource is located based on the resource identifier and code generated during compilation of the application. The resource is then returned to the application.

The invention may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

Figure 1:
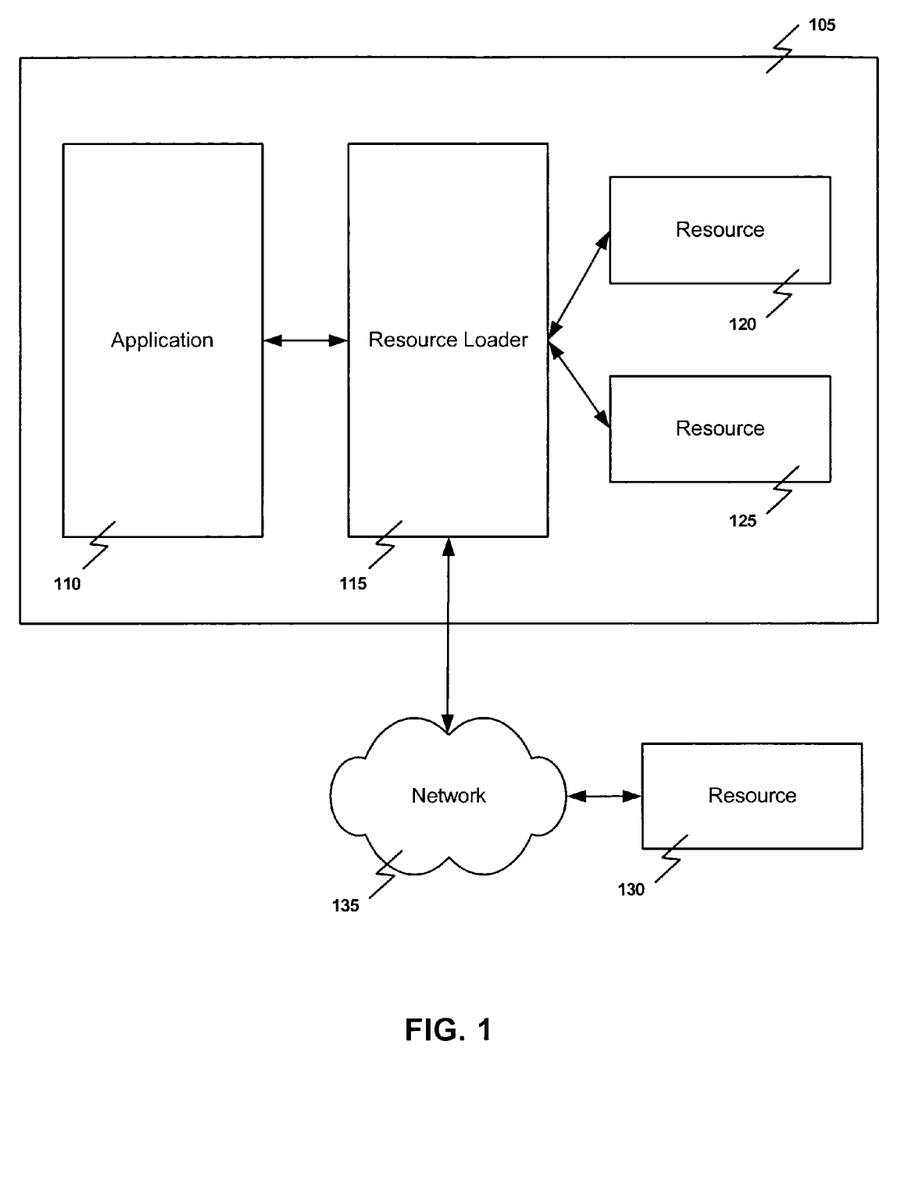
FIG. 1 illustrates resource lookup and redirection according to an embodiment of the present invention.

FIG. 1 illustrates resource lookup and redirection according to an embodiment of the present invention. In this example, a computer system 105 maintains and executes an application 110 such as any of the widely and commonly available types of applications like a word processor, spreadsheet, email, web browser, etc. During execution, the application 110 may utilize a number of resources 120-130. These resources may be in various forms such as a page, a file, a device, etc. Additionally, the resources may be located within the computer system 105 or elsewhere. For example, resource 130 may be located on another device connected with the computer system 105 via a network 135 such as the Internet or other type of wide area or local area network.

In order to access the resources 120-130, the application 110 calls, invokes, instantiates, or otherwise initiates execution of the resource loader 115. The application 110 also passes a resource identifier for the desired resource to the resource loader. The resource identifier may be a string representing a name for the resource or may be in another form. Regardless of the exact format of the resource identifier, it is used by the application to indicate to the resource loader which resource is desired without a need to indicate a protocol or location for the resource.

The resource loader includes code that locates the desired resource and returns that resource to the application. The code of the resource loader may be generated during compilation of the application, may be implemented as custom code of for one or more applications, may be part of a library, or may be implemented in another way. By using the resource loader, the application 110 need not include specific code representing fully qualified URIs for locating the resource. For example, the protocol for the resource need not be included in the application 110. Rather, the resource loader 115 maintains such information. In this way, the application may retain relative URIs to the desired resource that may be used as the resource identifier.

Therefore, if a packaging change is made or a resource is otherwise relocated, the source code of the application 110 does not need to be revised. For example, if a resource 125 is moved from being resident on the system 105 to being available via a network 135, the application 110 contains no code specific to the protocol or location of the resource 125. The application 110 contains only a relative URI to the resource 125 for use within the application 110. Therefore, nothing changes from the application's perspective.

As mentioned above, the resource loader 115 contains code that identifies each resource 120-130 utilized by the application 110 and includes specific information for locating and accessing that resource. For example, the resource loader 115 may include code indicating the type of resource, the protocol for accessing that resource, and other information specific to that resource. Therefore, when a resource is relocated or a packaging change is made, the application 110 may be recompiled to update the resource loader 115 but no code changes to the application 110 are needed.

In one embodiment, the resource loader 115 may be implemented as an instance of an object oriented class having an Application Program Interface (API) for receiving the resource identifier. This class may have a method that performs the operations needed to locate and access the resource indicated by the resource identifier and return the resource to the application 110. As will be seen, the code for performing the method of the resource loader 115, in one embodiment, may be generated during compilation of the application 110 based on the resources the application 110 utilizes.

Generally speaking, the code within the resource loader 115 may include a switch statement or similar structure that allows the resource loader 115 to branch based on the resource identifier passed to the resource loader 115 when called by the application 110. Each case of the switch statement may then contain a segment of code for locating and identifying the resource. The resource loader 115 then returns the resource to the applications 110. The resource may be returned to the application 110 in the form of an object or a stream to the resource based on the code within the resource loader 115. For example, a resource that is a page of data may be returned as an object that is an instance of that page class. Alternatively, a resource that is a file or device may be returned as a stream to that resource that the application may then use to access the resource. Additional details to the resource loader and the operations performed therein will be discussed below.

Figure 2:
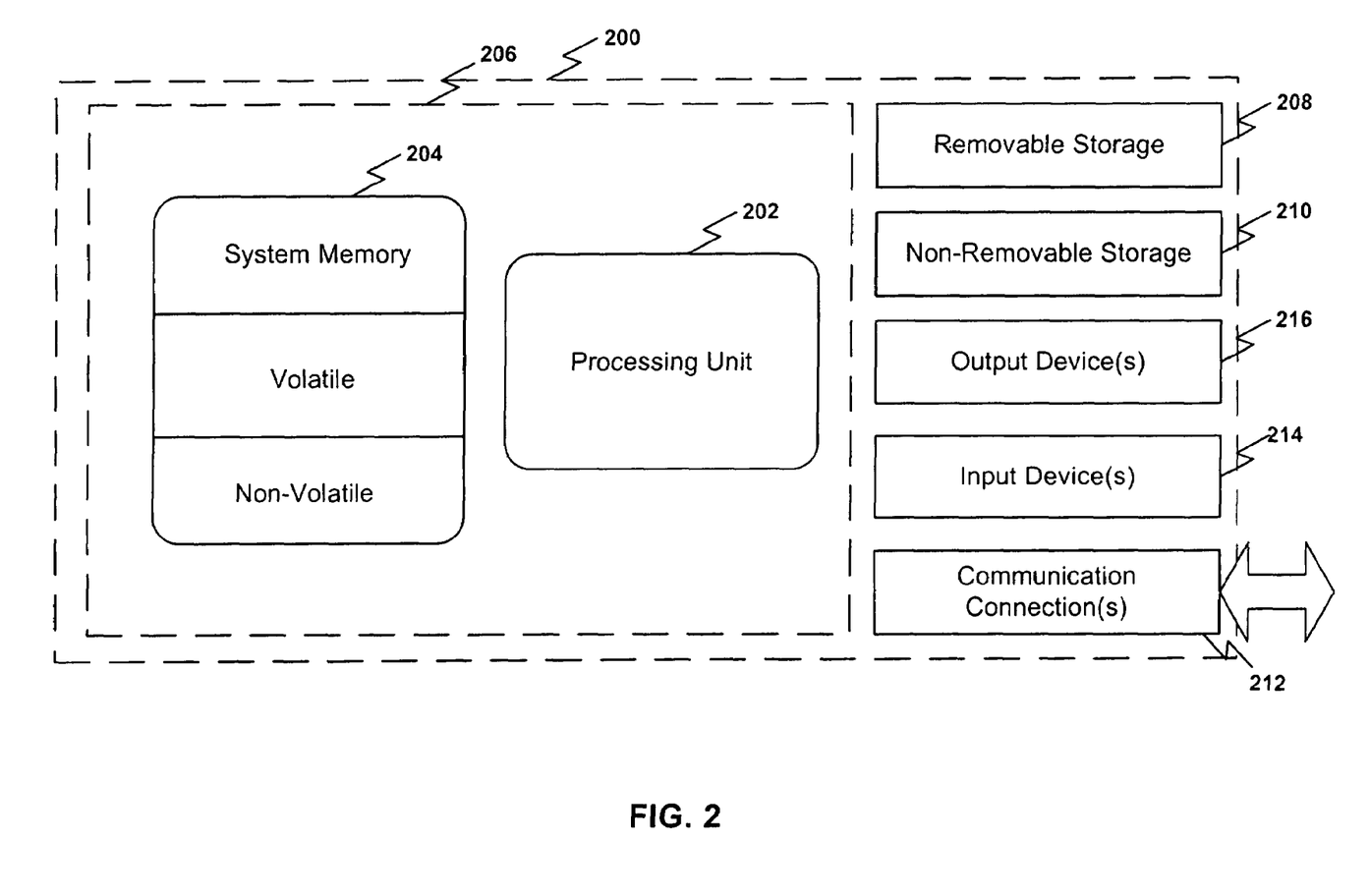
FIG. 2 illustrates an example of a suitable computing system environment on which embodiments of the invention may be implemented.

FIG. 2 illustrates an example of a suitable computing system environment on which embodiments of the invention may be implemented. This system 200 is representative of one that may be used as system 100 described above. In its most basic configuration, system 200 typically includes at least one processing unit 202 and memory 204. Depending on the exact configuration and type of computing device, memory 204 may be volatile (such as RAM), non-volatile (such as ROM, flash memory, etc.) or some combination of the two. This most basic configuration is illustrated in FIG. 2 by dashed line 206. Additionally, system 200 may also have additional features/functionality. For example, device 200 may also include additional storage (removable and/or non-removable) including, but not limited to, magnetic or optical disks or tape. Such additional storage is illustrated in FIG. 2 by removable storage 208 and non-removable storage 210. Computer storage media includes volatile and nonvolatile, removable and non-removable media implemented in any method or technology for storage of information such as computer readable instructions, data structures, program modules or other data. Memory 204, removable storage 208 and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by system 200. Any such computer storage media may be part of system 200.

System 200 typically includes communications connection(s) 212 that allow the system to communicate with other devices. Communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

System 200 may also have input device(s) 214 such as keyboard, mouse, pen, voice input device, touch input device, etc. Output device(s) 216 such as a display, speakers, printer, etc. may also be included. All these devices are well know in the art and need not be discussed at length here.

A computing device, such as system 200, typically includes at least some form of computer-readable media. Computer readable media can be any available media that can be accessed by the system 200. By way of example, and not limitation, computer-readable media might comprise computer storage media and communication media.

Figure 3:
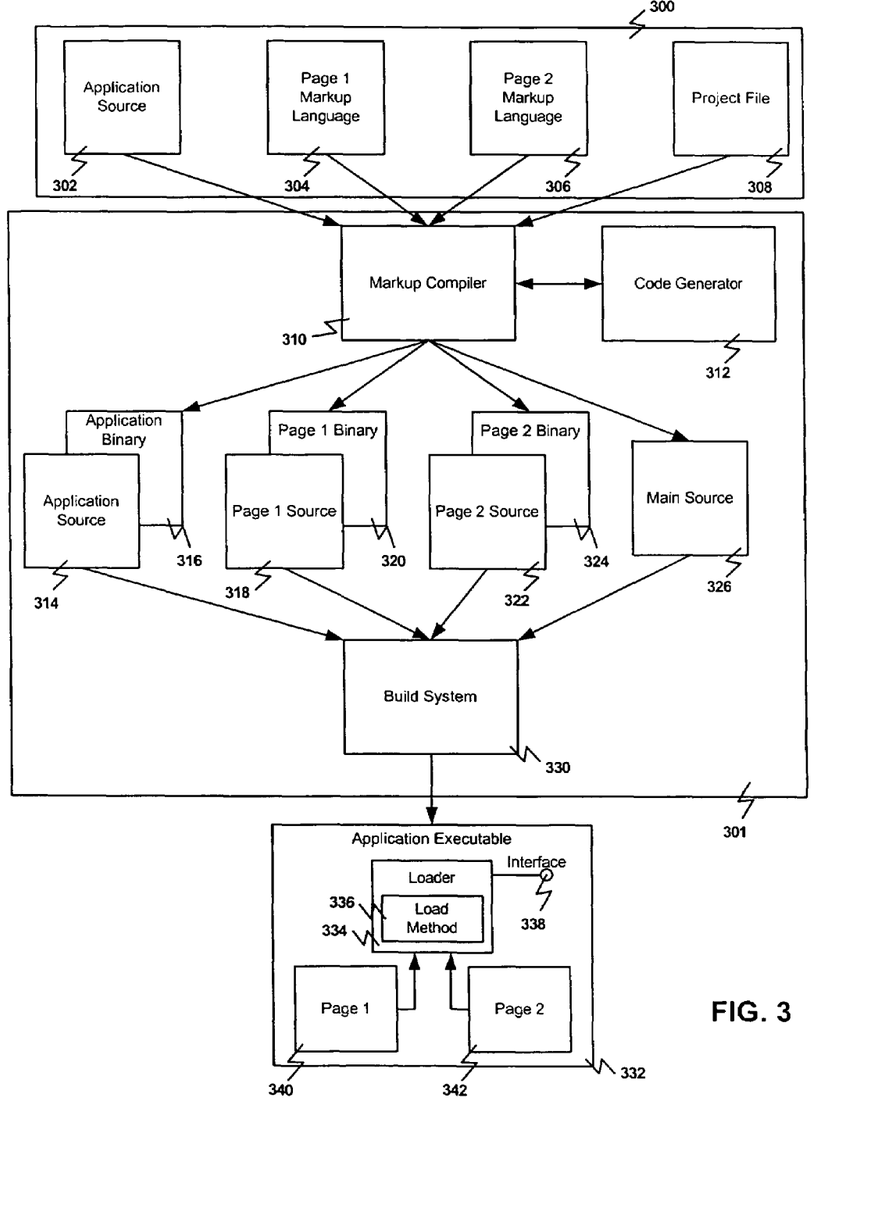
FIG. 3 illustrates functional components of a system for resource lookup and redirection according to an embodiment of the present invention.

FIG. 3 illustrates functional components of a system for resource lookup and redirection according to an embodiment of the present invention. This example illustrates source files 300 and a compilation and build system 301 that generates an application executable 332 that utilizes a resource loader 334. Generally speaking, the source files 300 are used by the compilation and build system 301 to generate an application executable 332 that includes a resource loader 334 and possibly one or more resources 340 and 342.

The source files 300 include an application source file 302, two resource files 304 and 306, and a project file 308. The application source file 302 contains source code, perhaps written in a high-level language such as C#, C++, or another language, that encodes the functions to be performed by the application. The resource files 304 and 306 in this example represent a page encoded in a markup language. These pages represent the resources to be used by the application executable 332 and include information related to that resource. For example, one page 304 may define a set of data to be used by the application while another page 306 may define a file to be used. Another page may identify a file resource located on a storage device. The project file 308 defines the entire project to be compiled. That is, the project file 308 lists all of the source files 300 and describes each for the compilation and build system 301.

The compilation and build system 301 includes a markup compiler 310 that reads the markup language of each of the source files 300. That is, the markup compiler parses the markup language contained in each of the source files 300 and, together with the code generator 312 produces a number of files. The markup compiler 310 receives a list of all resources that are to be packaged into the application from the project file 308. From this information, the code generator 312 generates code to be used by the resource loader 334 to identify, locate, and access that resource.

For example, the code generator 312 may build a switch statement or similar construct that includes a case for each resource used by the application. The body of each case includes resource information that identifies that resource. Details of the code generation operations will be discussed further below with reference to FIG. 6. Alternatively, rather than generating the resource loader code during compilation, the code of the resource loader may be implemented as custom code of for one or more applications, may be part of a library, or may be implemented in another way.

The markup compiler 310 and code generator 312 generate a number of files 314-326. These files 314-326 generally include a source file and a binary file for each of the source files 300. These files 314-326 are then used by the build system 330 to generate or assemble an application executable 332.

The application executable 332 includes a resource loader 334 and perhaps one or more resources 340 and 342. Alternatively, one or more of the resources may be external to the application. For example, while some resources, such as a block of data may be included in the application executable, other resources, such as a web page, or device, are external to the application executable and may even be on a device other than the one that executes the application.

The resource loader 334 of the application executable 332 includes code generated by the code generator 312 and provides the means through which the application executable 332 accesses resources. In one embodiment the resource loader may represent an instance of an object-oriented class. In such a case, the resource loader includes a method 336 for accessing a resource that returns the resource in the form of an object or a stream. Additionally, the resource loader instance may have an interface 338 through which the application executable 332 may call the resource loader 334. The interface 338 may allow one or more parameters or properties to be passed to the resource loader 334. For example, the resource loader may utilize a resource identifier in the form of a string variable or other form to identify the resource being called for by the application executable 332.

Therefore, the application executable 332, upon executing code that utilizes a resource, calls the resource loader 334 using the interface of the resource loader 338. Also via the interface, the application executable 332 passes a resource identifier to the resource loader 334 indicating the resource being utilized by the application executable 332. The method 336 of the resource loader 334 then executes the code generated by the code generator 312 to locate the resource indicated by the resource identifier. The method 336 of the resource loader 334 then returns the resource to the application executable 332. The resource may be returned in the form of an object that is an instance of the resource class. Alternatively, the resource may be returned in the form of a stream through which the application executable 332 may access the resource. For example, a resource that is a file may be returned by the method 336 of the resource loader 334 as an open stream through which the application executable may read from or write to the file.

The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 4:
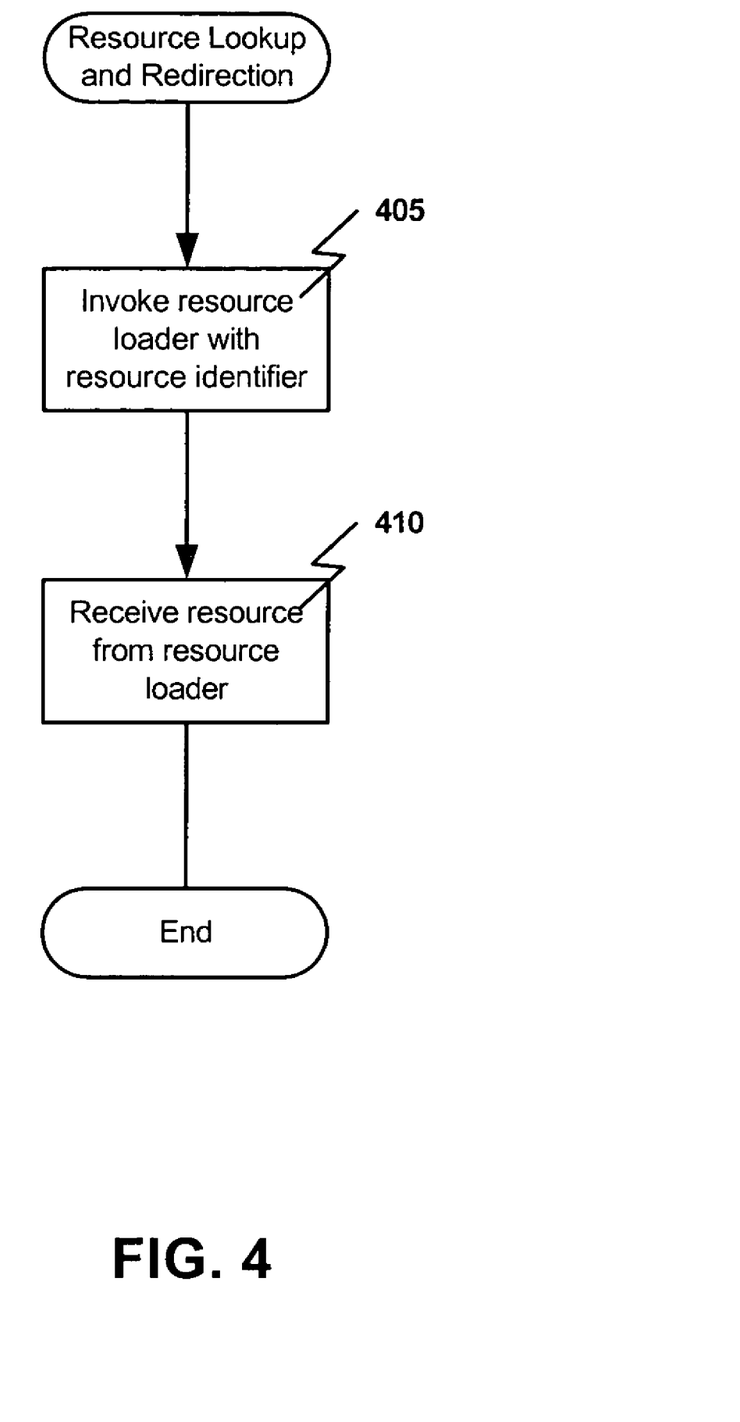
FIG. 4 is a flowchart illustrating resource lookup and redirection according to an embodiment of the present invention.

FIG. 4 is a flowchart illustrating resource lookup and redirection according to an embodiment of the present invention. Here, operation begins with invoke operation 405. Invoke operation 405 calls, invokes, or otherwise initiates execution of the resource loader. As explained above, the resource loader may include an interface through which the application may call the resource loader. Additionally, the interface may provide for transferring a resource identifier indicating the desired resource. Therefore, invoke operation 405 may also include passing a resource identifier to the resource loader. In some cases, the resource identifier may be a string variable representing a name of a resource being utilized. Alternatively other forms may be used such as a number or other identification.

Next, at receive operation 410 the application receives the resource from the resource loader. As discussed above, the resource loader, by executing code generated during compilation of the application, identifies the resource indicated by the resource identifier. The resource may be returned as an object or a stream. For example, a resource that is a page of information or block of data may be returned as an object that is an instance of the class of that page. Alternatively, the resource may be returned as a stream that the application may use to access the resource.

According to one embodiment of the present invention, the resource loader may be invoked by a call to an Application Program Interface (API). For example, an API named IResourceLoader may be defined as:

```
interface IResourceLoader
{
        object LoadResource (string resid)
}
```

According to this definition, IResourceLoader has a single interface that accepts a string variable representing the resource identifier. The resource loader in this example includes a single method named LoadResource that returns the resource or a stream to the resource. As will be described in detail below with reference to FIG. 5, the code to the LoadResource method is generated during compilation of the application source code.

Figure 5:
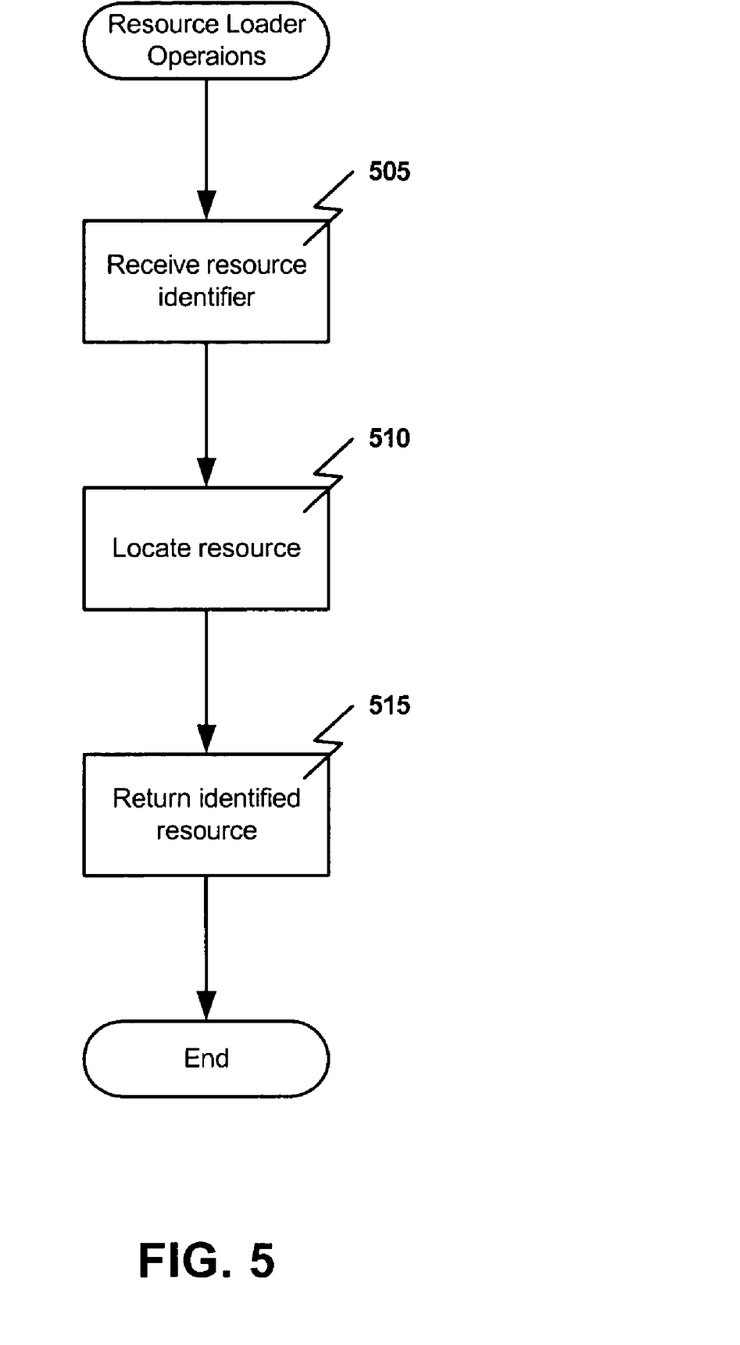
FIG. 5 is a flowchart illustrating resource loader operations according to an embodiment of the present invention.

FIG. 5 is a flowchart illustrating resource loader operations according to an embodiment of the present invention. In this example, operation begins with receive operation 505. Receive operation 505 receives the resource identifier from the application.

Next, locate operation 510 locates the resource indicated by the resource identifier. In some cases, locate operation 510 may be performed by a switch statement or similar operation. For example, the locate operation 510 may be performed by a switch statement in which each case of the statement represents a different resource identifier for a resource utilized by the application. The body of each case may then contain resource information for the resource loader to access the resource indicated by the resource identifier.

Then, at return operation 515, the resource loader may return the resource to the application. The resource may be returned as an object that is an instance of the resource class. In other cases, the resource may be returned as a stream through which the application may access the resource.

Listed below in Table 1 is exemplary code that may be used by the resource loader. This code is offered by way of example and not limitation. It is contemplated that other code may perform similar operations to provide the methods of the resource loader. As described above, this or other code for identifying, locating, and accessing a resource may be generated during compilation of the application as will be described further below with reference to FIG. 6 or may be implemented in other ways.

Figure 6:
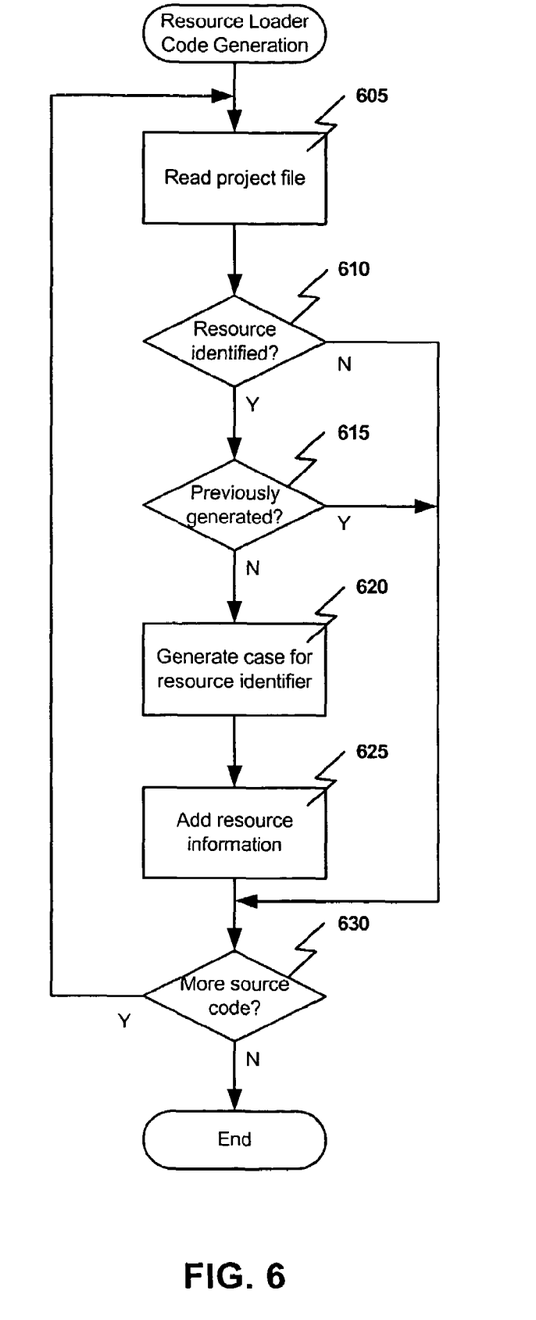
FIG. 6 is a flowchart illustrating resource loader code generation according to an embodiment of the present invention.

This example represents operations that may be performed by the code generator described above with reference to FIG. 3 during compilation of the application source code. Here operation begins with read operation 605. Read operation 605 reads the project file of the application source files to identify each resource.

Next, query operation 610 determines whether the project file statement being read represents a resource. This determination may be based on the type of statement or the presence of a resource identifier or other criteria. If a determination is made that the statement represents a resource, operation continues with query operation a 615.

Query operation 615 then determines whether the resource identified in the project file has previously been handled. That is, since code to handle a particular resource only needs to be generated once, subsequent identification of the same resource in the project file may be ignored. If a determination is made that the resource being identified has not previously been handled, operation continues with generate operation 620.

Generate operation 620 generates a case for the resource identifier. That is, the code generator may generate a case for a switch statement or other, similar construct to branch based on the resource identifier. In this way the resource can be located by the resource loader based on the resource identifier.

Next, generate operation 625 adds resource information to the body of the generated case or other branch. This resource information may include an indication of the type of resource, the protocol to be used for accessing the resource, a location for the resource, etc. Generally, this information may be collected from one or more markup language pages supplied to the compilation and build system with the application source file being compiled.

Finally, query operation 630 determines whether more code in the project file remains to be handled. This determination may be based on encountering an end-of-file marker or on other criteria. If a determination is made that more code remains in the project file, operation returns to read operation 605 and operation continues until no more code remains in the project file to be processed.

The description thus far describes a case where one resource loader is provided in the application executable.

TABLE 1

```
switch (resId)
        {
case "markup.xaml":
        return new MyApplication._Page1( );
case "picture1.jpg":
        stream = MyApplication.ResourceLoader.GetStreamResource("MySampApp.g", resId);
        resInfo = new System.Windows.Resources.StreamResourceInfo( );
        resInfo.Stream = stream;
        resInfo.ContentType = "image/jpg";
        return resInfo;
case "navigate.xaml":
        stream = MyApplication.ResourceLoader.GetStreamResource("MySampApp.g", resId);
        resInfo = new System.Windows.Resources.StreamResourceInfo( );
        resInfo.Stream = stream;
        resInfo.ContentType = "application/baml+xml";
        return resInfo;
default:
        return null;
}
```

FIG. 6 is a flowchart illustrating resource loader code generation according to an embodiment of the present invention.

However, as is well known, various modules or libraries such as Dynamic Link Libraries (DLLs) may be linked or added to an application executable during compilation. Further, each of these libraries may provide a resource loader. This raises a question of which resource loader, or which instance of the resource loader class, an application should use for a given resource. This may be addressed by a form of resource chaining in which a chain of resource loaders is built and traversed by a resource loader service.

Figure 7:
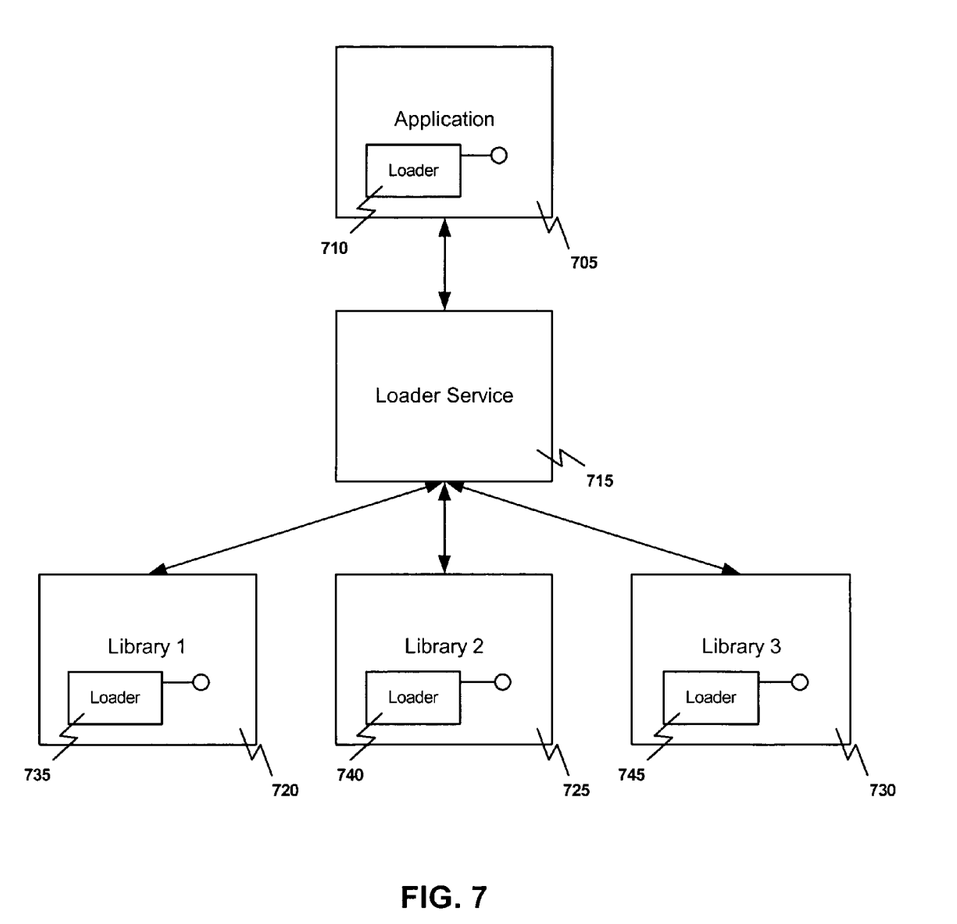
FIG. 7 illustrates resource loader chaining according to an embodiment of the present invention.

FIG. 7 illustrates resource loader chaining according to an embodiment of the present invention. In this example, an application 705 including a resource loader 710 links to a number of libraries 720-730. Each library 720-730 contains a resource loader 735-745. Also included is a resource loader service 715. Generally speaking, the resource loader service 715 handles calls or requests for resources and determines which resource loader to use.

The resource loader service, similar to the resource loader may be implemented as an instance of a class having an interface for receiving a resource identifier. Additionally, the resource loader service class may have a method that determines which resource loader, from a number of possible resource loaders, should be utilized to access a resource indicated by the resource identifier. This method may the call the appropriate resource loader with the resource identifier. Then, when the called resource loader returns the resource, the method of the resource loader service may return that resource to the application.

Figure 8:
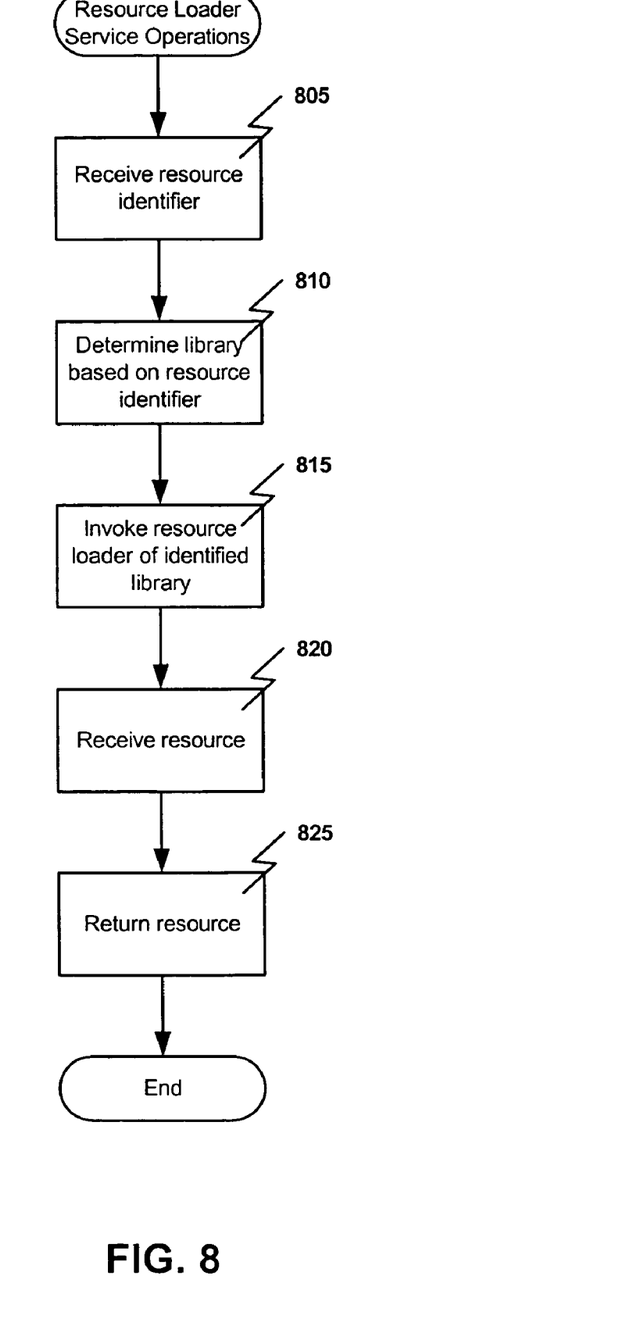
FIG. 8 is a flowchart illustrating resource loader service operations according to an embodiment of the present invention.

FIG. 8 is a flowchart illustrating resource loader service operations according to an embodiment of the present invention. These operations represent those that may be performed by the resource loader service 715 described above. Here operation begins with receive operation 805. Receive operation 805 receives a resource identifier. That is, when the application requests a resource, it may do so using the interface of the resource loader service including passing a resource identifier for the resource being requested.

Next, at determination operation 810, a determination is made as to which resource loader to use. This determination may be based on serially calling the chained resource loaders one by one until the requested resource is located. That is, the resource may be located by "walking the chain" of resource loaders until the requested resource is located by the resource loader service.

Invoke operation 815 then calls the resource loader identified in determination operation 810. That is, the indicated resource loader for the resource being requested is called using the interface for that resource loader. Additionally, the resource identifier for the requested resource is passed to the called resource loader via the interface for that resource loader.

Next, receive operation 820 receives the resource returned from the called resource loader. This resource is then returned to the applications at return operation 825.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A computer-implemented method of resource lookup comprising:
   generating a code by compiling an application source file and a project file of the application source file;
   receiving a relative resource identifier from the application source file indicating a resource to be utilized by the application, wherein the relative resource identifier does not indicate a protocol or a location for the resource;
   locating the resource based on the relative resource identifier and the code generated during compilation of the application; and
   returning the resource to the application,
   wherein the code generated during compilation of the application comprises a branching construct having one or more cases,
   wherein each case of the branching construct comprises resource information identifying the resource indicated by the relative resource identifier, and
   wherein receiving the relative resource identifier from the application source file comprises receiving the relative resource identifier via an Application Program Interface.

2. The method of claim 1, wherein the relative resource identifier is a string representing a name of the resource.

3. The method of claim 1, wherein returning the resource to the application comprises returning an object that is an instance of a class of the resource.

4. The method of claim 1, wherein returning the resource comprises returning an open stream to the resource.

5. A system for resource lookup comprising:
   a processor; and
   a memory coupled with and readable by the processor and containing a series of instructions that, when executed by the processor, cause the processor to:
      generate a code by compiling an application source file and a project file of the application source file;
      receive a relative resource identifier from the application source file indicating a resource to be utilized by the application, wherein the relative resource identifier does not indicate a protocol or a location for the resource;
      locate the resource based on the relative resource identifier and the code generated during compilation of the application, and
      return the resource to the application,
   wherein the code generated during compilation of the application comprises a branching construct having one or more cases,
   wherein each case of the branching construct comprises resource information identifying the resource indicated by the relative resource identifier, and
   wherein receiving the relative resource identifier from the application source file comprises receiving the relative resource identifier via an Application Program Interface.

6. The system of claim 5, wherein the relative resource identifier is a string representing a name of the resource.

7. The system of claim 5, wherein returning the resource to the application comprises returning an object that is an instance of a class of the resource.

8. The system of claim 5, wherein returning the resource comprises returning an open stream to the resource.

9. A machine-readable storage medium encoding a computer program of instructions for executing a computer process for resource lookup by a computer system, said computer process comprising:
   generating a code by compiling an application source file and a project file of the application source file;
   receiving a relative resource identifier from the application source file indicating a resource to be utilized by the application, wherein the relative resource identifier does not indicate a protocol or a location for the resource;
   locating the resource based on the relative resource identifier and the code generated during compilation of the application; and returning the resource to the application, wherein the code generated during compilation of the application comprises a branching construct having one or more cases, wherein each case of the branching construct comprises resource information identifying the resource indicated by the relative resource identifier, and wherein receiving the relative resource identifier from the application source file comprises receiving the relative resource identifier via an Application Program Interface.

10. The machine-readable storage medium of claim 9, wherein the relative resource identifier is a string representing a name of the resource.

11. The machine-readable storage medium of claim 9, wherein returning the resource to the application comprises returning an object that is an instance of a class of the resource.

12. The machine-readable storage medium of claim 9, wherein returning the resource comprises returning an open stream to the resource.

* * * * *